(12) United States Patent
McLellan et al.

(10) Patent No.: US 9,814,981 B2
(45) Date of Patent: *Nov. 14, 2017

(54) CUSTOMIZED CHANCE-BASED ITEMS

(71) Applicant: KABAM, INC., San Francisco, CA (US)

(72) Inventors: Sam McLellan, San Francisco, CA (US); Luc Pieron, San Francisco, CA (US); Stephanie Schultz, San Francisco, CA (US)

(73) Assignee: Aftershock Services, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/334,957

(22) Filed: Oct. 26, 2016

(65) Prior Publication Data
US 2017/0043254 A1  Feb. 16, 2017

Related U.S. Application Data

(63) Continuation of application No. 14/162,813, filed on Jan. 24, 2014, now Pat. No. 9,508,222.

(51) Int. Cl.
*A63F 9/24* (2006.01)
*A63F 13/00* (2014.01)
(Continued)

(52) U.S. Cl.
CPC .............. *A63F 13/55* (2014.09); *A63F 13/12* (2013.01); *A63F 13/335* (2014.09); *A63F 13/35* (2014.09);
(Continued)

(58) Field of Classification Search
CPC ............ A63F 2300/575; A63F 2300/57; A63F 2300/609; A63F 2300/807; G07F 17/3244; G07F 17/3262
See application file for complete search history.

(56) References Cited

U.S. PATENT DOCUMENTS 5,816,918 A   10/1998   Kelly
5,933,813 A   8/1999   Teicher
(Continued)

FOREIGN PATENT DOCUMENTS

KR   1020130137431   12/2013
WO   0226333   1/2002
(Continued)

OTHER PUBLICATIONS

Gem System—Street Fighter X Tekken, http://www.streetfighter.com/us/sfxtk/features/gem-system, printed Nov. 6, 2012, 6 pages.
(Continued)

*Primary Examiner* — Milap Shah
*Assistant Examiner* — Jason Pinheiro
(74) *Attorney, Agent, or Firm* — Sheppard Mullin Richter & Hampton LLP

(57) ABSTRACT

A system configured to facilitate user customization of the distribution of virtual items usable in a virtual space. Virtual items may be distributed via probability item bundles. Probability item bundles may be associated with a set of potential awards. The potential awards included in the set of potential awards may be individually associated with a probability of being distributed once the probability item bundle is activated by a user. Customization of probability item bundles may comprise facilitating user selection of the potential awards included in the sets of potential awards of the probability item bundles.

20 Claims, 4 Drawing Sheets

(51) Int. Cl.
*G06F 17/00* (2006.01)
*G06F 19/00* (2011.01)
*A63F 13/55* (2014.01)
*A63F 13/30* (2014.01)
*G07F 17/32* (2006.01)
*A63F 13/35* (2014.01)
*A63F 13/63* (2014.01)
*A63F 13/69* (2014.01)
*A63F 13/792* (2014.01)
*A63F 13/335* (2014.01)

(52) U.S. Cl.
CPC .............. *A63F 13/63* (2014.09); *A63F 13/69* (2014.09); *A63F 13/792* (2014.09); *G07F 17/3227* (2013.01); *G07F 17/3244* (2013.01); *G07F 17/3281* (2013.01)

(56) References Cited

U.S. PATENT DOCUMENTS

| | | | |
|---|---|---|---|
| 5,964,660 A | 10/1999 | James | |
| 6,142,472 A | 11/2000 | Kliebisch | |
| 6,190,225 B1 | 2/2001 | Coleman | |
| 6,190,255 B1 | 2/2001 | Thomas | |
| 6,347,996 B1 | 2/2002 | Gilmore | |
| 6,402,619 B1 | 6/2002 | Sato | |
| 6,561,904 B2 | 5/2003 | Locke | |
| 6,604,008 B2 | 8/2003 | Chudley | |
| 6,745,236 B1 * | 6/2004 | Hawkins | A63F 3/00075 463/29 |
| 6,811,483 B1 | 11/2004 | Webb | |
| 6,850,900 B1 | 2/2005 | Hare | |
| 6,928,474 B2 | 8/2005 | Venkatesan | |
| 7,076,453 B2 | 7/2006 | Jammes | |
| 7,381,133 B2 | 6/2008 | Thomas | |
| 7,533,336 B2 | 5/2009 | Jaffe | |
| 7,660,740 B2 | 2/2010 | Boone | |
| 7,682,239 B2 | 3/2010 | Friedman | |
| 7,785,188 B2 | 8/2010 | Cannon | |
| 7,813,821 B1 | 10/2010 | Howell | |
| 7,819,749 B1 | 10/2010 | Fish | |
| 7,945,802 B2 | 5/2011 | Hamilton, II | |
| 7,959,507 B2 | 6/2011 | Cannon | |
| 8,010,404 B1 | 8/2011 | Wu | |
| 8,016,668 B2 | 9/2011 | Hardy | |
| 8,047,909 B2 | 11/2011 | Walker | |
| 8,057,294 B2 | 11/2011 | Pacey | |
| 8,066,571 B2 | 11/2011 | Koster | |
| 8,147,340 B2 | 4/2012 | BrunetdeCourssou | |
| 8,157,635 B2 | 4/2012 | Hardy | |
| 8,187,101 B2 | 5/2012 | Herrmann | |
| 8,226,472 B2 | 7/2012 | Van Luchene | |
| 8,231,453 B2 | 7/2012 | Wolf | |
| 8,231,470 B2 | 7/2012 | Feeney | |
| 8,239,487 B1 | 8/2012 | Hoffman | |
| 8,246,439 B2 | 8/2012 | Kelly | |
| 8,272,934 B2 | 9/2012 | Olive | |
| 8,272,951 B2 | 9/2012 | Ganz | |
| 8,272,956 B2 | 9/2012 | Kelly | |
| 8,282,491 B2 | 10/2012 | Auterio | |
| 8,287,367 B2 | 10/2012 | Hall | |
| 8,287,383 B1 | 10/2012 | Etter | |
| 8,287,384 B2 | 10/2012 | Auterio | |
| 8,292,743 B1 | 10/2012 | Etter | |
| 8,313,372 B2 | 11/2012 | Naicker | |
| 8,317,584 B2 | 11/2012 | Aoki | |
| 8,317,601 B1 | 11/2012 | Luciano, Jr. | |
| 8,323,110 B2 | 12/2012 | Shibamiya | |
| 8,328,642 B2 | 12/2012 | Mosites | |
| 8,332,260 B1 | 12/2012 | Mysen | |
| 8,332,544 B1 | 12/2012 | Ralls | |
| 8,348,716 B2 | 1/2013 | Ganz | |
| 8,348,762 B2 | 1/2013 | Willis | |
| 8,348,767 B2 | 1/2013 | Mahajan | |
| 8,348,768 B2 | 1/2013 | Auterio | |
| 8,360,858 B2 | 1/2013 | LaRocca | |
| 8,360,867 B2 | 1/2013 | VanLuchene | |
| 8,360,868 B2 | 1/2013 | Shvili | |
| 8,366,544 B2 | 2/2013 | Walker | |
| 8,366,550 B2 | 2/2013 | Herrmann | |
| 8,371,925 B2 | 2/2013 | Bonney | |
| 8,376,826 B2 | 2/2013 | Katz | |
| 8,382,572 B2 | 2/2013 | Hoffman | |
| 8,388,427 B2 | 3/2013 | Yariv | |
| 8,401,913 B2 | 3/2013 | Alivandi | |
| 8,408,989 B2 | 4/2013 | Bennett | |
| 8,439,759 B1 | 5/2013 | Mello | |
| 8,475,262 B2 | 7/2013 | Wolf | |
| 8,506,394 B2 | 8/2013 | Kelly | |
| 8,512,150 B2 | 8/2013 | Herrmann | |
| 8,583,266 B2 | 11/2013 | Herbrich | |
| 8,636,591 B1 | 1/2014 | Hawk | |
| 8,696,428 B1 | 4/2014 | Post | |
| 8,715,068 B2 | 5/2014 | Arnone | |
| 8,777,754 B1 | 7/2014 | Santini | |
| 8,784,214 B2 | 7/2014 | Parks | |
| 8,790,185 B1 | 7/2014 | Caldarone | |
| 8,821,260 B1 | 9/2014 | DeSanti | |
| 8,831,758 B1 | 9/2014 | Chu | |
| 8,851,978 B1 | 10/2014 | Koh | |
| 8,920,243 B1 | 12/2014 | Curtis | |
| 8,961,319 B1 | 2/2015 | Pieron | |
| 8,968,067 B1 | 3/2015 | Curtis | |
| 9,138,639 B1 | 9/2015 | Ernst | |
| 9,257,007 B2 | 2/2016 | Santini | |
| 2002/0059397 A1 | 5/2002 | Feola | |
| 2002/0072412 A1 | 6/2002 | Young | |
| 2002/0094863 A1 | 7/2002 | Klayh | |
| 2002/0095327 A1 | 7/2002 | Zumel | |
| 2002/0115488 A1 | 8/2002 | Berry | |
| 2002/0119824 A1 | 8/2002 | Allen | |
| 2002/0151351 A1 | 10/2002 | Baerlocher | |
| 2002/0165794 A1 | 11/2002 | Ishihara | |
| 2002/0183105 A1 | 12/2002 | Cannon | |
| 2002/0193162 A1 | 12/2002 | Walker | |
| 2003/0008713 A1 | 1/2003 | Ushiro | |
| 2003/0027619 A1 | 2/2003 | Nicastro | |
| 2003/0032476 A1 | 2/2003 | Walker | |
| 2003/0102625 A1 | 6/2003 | Katz | |
| 2003/0109301 A1 | 6/2003 | Chudley | |
| 2003/0157978 A1 | 8/2003 | Englman | |
| 2003/0174178 A1 | 9/2003 | Hodges | |
| 2003/0190960 A1 | 10/2003 | Jokipii | |
| 2003/0216167 A1 | 11/2003 | Gauselmann | |
| 2004/0002387 A1 | 1/2004 | Grady | |
| 2004/0068451 A1 | 4/2004 | Lenk | |
| 2004/0185932 A1 | 9/2004 | Lombardo | |
| 2004/0215524 A1 | 10/2004 | Parkyn | |
| 2004/0224745 A1 | 11/2004 | Bregenzer | |
| 2004/0225387 A1 | 11/2004 | Smith | |
| 2004/0267611 A1 | 12/2004 | Hoerenz | |
| 2005/0096117 A1 | 5/2005 | Katz | |
| 2005/0114223 A1 | 5/2005 | Schneider | |
| 2005/0165686 A1 | 7/2005 | Zack | |
| 2005/0192087 A1 | 9/2005 | Friedman | |
| 2005/0209008 A1 | 9/2005 | Shimizu | |
| 2005/0227751 A1 | 10/2005 | Zanelli | |
| 2005/0255914 A1 | 11/2005 | McHale | |
| 2005/0277474 A1 | 12/2005 | Barry | |
| 2006/0030407 A1 | 2/2006 | Thayer | |
| 2006/0063587 A1 | 3/2006 | Manzo | |
| 2006/0116196 A1 | 6/2006 | Vancura | |
| 2006/0155597 A1 | 7/2006 | Gleason | |
| 2006/0200370 A1 | 9/2006 | Ratliff | |
| 2006/0217198 A1 | 9/2006 | Johnson | |
| 2006/0287029 A1 | 12/2006 | Yoshinobu | |
| 2006/0287102 A1 | 12/2006 | White | |
| 2007/0021213 A1 | 1/2007 | Foe | |
| 2007/0077988 A1 | 4/2007 | Friedman | |
| 2007/0111770 A1 | 5/2007 | Van Luchene | |
| 2007/0129139 A1 | 6/2007 | Nguyen | |
| 2007/0129147 A1 | 6/2007 | Gagner | |
| 2007/0191101 A1 | 8/2007 | Coliz | |

(56) References Cited

U.S. PATENT DOCUMENTS

| | | |
|---|---|---|
| 2007/0191102 A1 | 8/2007 | Coliz |
| 2007/0213116 A1 | 9/2007 | Crawford |
| 2007/0281285 A1 | 12/2007 | Jayaweera |
| 2008/0009344 A1 | 1/2008 | Graham |
| 2008/0032787 A1 | 2/2008 | Low |
| 2008/0058092 A1 | 3/2008 | Schwartz |
| 2008/0113706 A1 | 5/2008 | OHalloran |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo |
| 2008/0176625 A1 | 7/2008 | Kelly |
| 2008/0194318 A1 | 8/2008 | Kralicky |
| 2008/0200260 A1 | 8/2008 | Deng |
| 2008/0207306 A1 | 8/2008 | Higbie |
| 2008/0214295 A1 | 9/2008 | Dabrowski |
| 2008/0227525 A1 | 9/2008 | Kelly |
| 2008/0234043 A1 | 9/2008 | McCaskey |
| 2008/0248867 A1 | 10/2008 | Englman |
| 2008/0275786 A1 | 11/2008 | Gluck |
| 2008/0300045 A1 | 12/2008 | Ratcliff |
| 2008/0318668 A1 | 12/2008 | Ching |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0124353 A1 | 5/2009 | Collette |
| 2009/0204907 A1 | 8/2009 | Finn |
| 2009/0210301 A1 | 8/2009 | Porter |
| 2009/0234710 A1 | 9/2009 | Belgaied Hassine |
| 2009/0315893 A1 | 12/2009 | Smith |
| 2010/0004048 A1 | 1/2010 | Brito |
| 2010/0022307 A1 | 1/2010 | Steuer |
| 2010/0035689 A1 | 2/2010 | Altshuler |
| 2010/0041472 A1 | 2/2010 | Gagner |
| 2010/0041481 A1 | 2/2010 | Smedley |
| 2010/0050088 A1 | 2/2010 | Neustaedter |
| 2010/0070056 A1 | 3/2010 | Coronel |
| 2010/0094841 A1 | 4/2010 | Bardwil |
| 2010/0099471 A1 | 4/2010 | Feeney |
| 2010/0107214 A1 | 4/2010 | Ganz |
| 2010/0113162 A1 | 5/2010 | Vemuri |
| 2010/0174593 A1 | 7/2010 | Cao |
| 2010/0198653 A1 | 8/2010 | Bromenshenkel |
| 2010/0210356 A1 | 8/2010 | Losica |
| 2010/0227675 A1 | 9/2010 | Luxton |
| 2010/0227682 A1 | 9/2010 | Reville |
| 2010/0228606 A1 | 9/2010 | Walker |
| 2010/0240444 A1 | 9/2010 | Friedman |
| 2010/0241491 A1 | 9/2010 | Eglen |
| 2010/0241492 A1 | 9/2010 | Eglen |
| 2010/0306015 A1 | 12/2010 | Kingston |
| 2011/0065511 A1 | 3/2011 | Mahan |
| 2011/0092271 A1 | 4/2011 | Nguyen |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0118002 A1 | 5/2011 | Aoki |
| 2011/0145040 A1 | 6/2011 | Zahn |
| 2011/0151957 A1 | 6/2011 | Falciglia |
| 2011/0218033 A1 | 9/2011 | Englman |
| 2011/0227919 A1 | 9/2011 | Bongio |
| 2011/0256921 A1 | 10/2011 | Pacey |
| 2011/0256936 A1 | 10/2011 | Walker |
| 2011/0263324 A1 | 10/2011 | Ganetakos |
| 2011/0275438 A9 | 11/2011 | Hardy |
| 2011/0281638 A1 | 11/2011 | Bansi |
| 2011/0281654 A1 | 11/2011 | Kelly |
| 2011/0282764 A1 | 11/2011 | Borst |
| 2011/0300923 A1 | 12/2011 | VanLuchene |
| 2011/0319152 A1 | 12/2011 | Ross |
| 2011/0319170 A1 | 12/2011 | Shimura |
| 2012/0011002 A1 | 1/2012 | Crowe |
| 2012/0015714 A1 | 1/2012 | Ocko |
| 2012/0015715 A1 | 1/2012 | Luxton |
| 2012/0034961 A1 | 2/2012 | Berman |
| 2012/0034973 A1 | 2/2012 | Frank |
| 2012/0040743 A1 | 2/2012 | Auterio |
| 2012/0040761 A1 | 2/2012 | Auterio |
| 2012/0042282 A1 | 2/2012 | Wong |
| 2012/0047002 A1 | 2/2012 | Patel |
| 2012/0059730 A1 | 3/2012 | Jensen |
| 2012/0083909 A1 | 4/2012 | Carpenter |
| 2012/0094743 A1 | 4/2012 | Odom |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0157193 A1 | 6/2012 | Arezina |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas |
| 2012/0231891 A1* | 9/2012 | Watkins, Jr. ........ G06Q 30/0283 463/43 |
| 2012/0244945 A1 | 9/2012 | Kolo |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider |
| 2012/0282986 A1 | 11/2012 | Castro |
| 2012/0289315 A1 | 11/2012 | Van Luchene |
| 2012/0289330 A1 | 11/2012 | Leydon |
| 2012/0289346 A1 | 11/2012 | VanLuchene |
| 2012/0295699 A1 | 11/2012 | Reiche |
| 2012/0296716 A1 | 11/2012 | Barbeau |
| 2012/0302329 A1 | 11/2012 | Katz |
| 2012/0309504 A1 | 12/2012 | Isozaki |
| 2012/0311504 A1 | 12/2012 | vanOs |
| 2012/0322545 A1 | 12/2012 | Arnone |
| 2012/0322561 A1 | 12/2012 | Kohlhoff |
| 2012/0330785 A1* | 12/2012 | Hamick ................ G06Q 30/06 705/26.41 |
| 2013/0005437 A1 | 1/2013 | Bethke |
| 2013/0005438 A1 | 1/2013 | Ocko |
| 2013/0005466 A1 | 1/2013 | Mahajan |
| 2013/0005473 A1 | 1/2013 | Bethke |
| 2013/0005475 A1 | 1/2013 | Mahajan |
| 2013/0005480 A1 | 1/2013 | Bethke |
| 2013/0006735 A1 | 1/2013 | Koenigsberg |
| 2013/0006736 A1 | 1/2013 | Bethke |
| 2013/0012304 A1 | 1/2013 | Cartwright |
| 2013/0013094 A1 | 1/2013 | Parks |
| 2013/0013326 A1 | 1/2013 | Miller |
| 2013/0013404 A1 | 1/2013 | Suprock |
| 2013/0013459 A1 | 1/2013 | Kerr |
| 2013/0029745 A1 | 1/2013 | Kelly |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman |
| 2013/0095914 A1 | 4/2013 | Allen |
| 2013/0123005 A1 | 5/2013 | Allen |
| 2013/0124361 A1 | 5/2013 | Bryson |
| 2013/0151342 A1 | 6/2013 | Citron |
| 2013/0173393 A1 | 7/2013 | Calman |
| 2013/0178259 A1 | 7/2013 | Strause |
| 2013/0210511 A1 | 8/2013 | LaRocca |
| 2013/0217489 A1 | 8/2013 | Bendayan |

(56) References Cited

U.S. PATENT DOCUMENTS

| | | | |
|---|---|---|---|
| 2013/0226733 A1 | 8/2013 | Evans | |
| 2013/0237299 A1 | 9/2013 | Bancel | |
| 2013/0244767 A1 | 9/2013 | Barclay | |
| 2013/0288757 A1 | 10/2013 | Guthridge | |
| 2013/0290147 A1 | 10/2013 | Chandra | |
| 2013/0303726 A1 | 11/2013 | Mozzarelli | |
| 2013/0310164 A1 | 11/2013 | Walker | |
| 2013/0344932 A1 | 12/2013 | Adams | |
| 2014/0004884 A1 | 1/2014 | Chang | |
| 2014/0018156 A1 | 1/2014 | Rizzotti | |
| 2014/0033262 A1 | 1/2014 | Anders | |
| 2014/0038679 A1 | 2/2014 | Snow | |
| 2014/0067526 A1 | 3/2014 | Raju | |
| 2014/0067544 A1 | 3/2014 | Klish | |
| 2014/0073436 A1 | 3/2014 | Takagi | |
| 2014/0087864 A1 | 3/2014 | Togashi | |
| 2014/0089048 A1 | 3/2014 | Bruich | |
| 2014/0100020 A1 | 4/2014 | Carroll | |
| 2014/0106858 A1 | 4/2014 | Constable | |
| 2014/0128137 A1 | 5/2014 | Balise | |
| 2014/0157314 A1 | 6/2014 | Roberts | |
| 2014/0206452 A1 | 7/2014 | Bambino | |
| 2014/0243072 A1* | 8/2014 | Santini | G07F 17/32 463/20 |
| 2014/0274359 A1 | 9/2014 | Helava | |
| 2014/0295958 A1 | 10/2014 | Shono | |
| 2014/0315616 A1 | 10/2014 | Avin | |
| 2014/0329585 A1 | 11/2014 | Santini | |
| 2014/0337259 A1 | 11/2014 | Lamb | |
| 2015/0011286 A1 | 1/2015 | Kim | |
| 2015/0019349 A1 | 1/2015 | Milley | |
| 2015/0031440 A1 | 1/2015 | Desanti | |
| 2015/0087378 A1 | 3/2015 | Louie | |
| 2015/0306494 A1 | 10/2015 | Pieron | |
| 2015/0335995 A1 | 11/2015 | McLellan | |
| 2015/0352436 A1 | 12/2015 | Pieron | |

FOREIGN PATENT DOCUMENTS

| | | |
|---|---|---|
| WO | 2013013281 | 1/2013 |
| WO | 2013059639 | 1/2013 |
| WO | 2013116904 | 1/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

Profession—WoWWiki—Your guide to the World of Warcraft, URL: http://www.wowwiki.com/Profession, printed Nov. 6, 2012, 8 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Behavioural Analytics & Campaigning", http://lotaris.com/behavioural._analytics_and._Campaigning.htm, screenshot access date May 24, 2012 2:21 PM, 1 page.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Clash of Clans". Wikipedia.org. Online. Accessed via the Internet. Accessed Aug. 9, 2014. <URL: http://en.wikipedia.org/wiki/Clash of Clans>, 3 pages.

"Lotro-Wiki.com" (evidence in regards to "Lord of the kings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_$_L$ _Part_1&oldid=399597, http://lotro-wiki.com/index.php?title=Quest:A_Little_Extra_Never_Hurts_—_Part_2& oldid=399366, http://lotro-wiki.com/index.php?title=Getting_Started&oldid=349681, Links are to used article.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Building Structures". War2.warcraft.org. Online. Accessed via the Internet. Accessed Aug. 9, 2014. <URL: http://war2.warcraft.org/strategy/verybasics/building.shtml>, 3 pages.

City Coins. CityVille Wikia. Online. Accessed via the Internet. Accessed Aug. 9, 2014. <URL: http://cityville.wikia.com/wiki/City_Coins>, 2 pages.

Gaia "Black Friday Bundle" available on Nov. 23, 2011, from http://www.gaiaonline.com/forum/community-announcements/black-friday-big-bundles-rare-items/t.76127933/, 5 pages.

UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.

Wiki "Gaia online", available on Sep. 9, 2011, https://web.archive.org/web/20110927210155/http://en.wikipedia.org/wiki/Gaia_Online, 8 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles, 7 pages.

TFWiki "teamfortress wiki" available Nov. 5, 2011 retrieved from https://web.archive.org/web/20111105044256/http://wiki.teamfortress.com/wiki/Loadout, 4 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

Super Mario Bros. 3 Review, Nintendo for NES, Feb. 1990, pp. 1-4.

Super Mario Bros. 3, NES Gameplay, http://www.youtube.com/watch?v=82TL-Acm4ts, 1 page.

"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.

"Rest—WoWWiki—Your guide to the World of Warcraft", printed from http://www.wowwiki.com/Rest, May 19, 2014, 2 pages.

Quest item—WoWWiki—Your guide to the World of Warcraft', printed from http://www.wowwiki.com/Quest_item, Retrieved on Apr. 16, 2014, 1 page.

"Cataclysm Guide: Guild Advancement-Wowhead", http://www.wowhead.com/guide=cataclysm&guilds, printed Dec. 5, 2013, 4 pages.

TFF Challenge—UC Davis, http://tffchallenge.com/team/uc-davis/, printed Jan. 15, 2014, 12 pages.

"Guild Housing System—FlyFF Wiki", http://flyff-wiki.gpotato.com/wiki/Guild_Housing_System, printed Dec. 5, 2013, 5 pages.

Elsword, Dec. 27, 2007, KOG Studios, Guide posted Mar. 17, 2011, http://forums.elswordonline.com/topic5673.aspx, http://en.wikipedia.org/wiki/Elsword, 16 pages.

Diablo 2, Blizzard Entertainment, Mar. 23, 2009, manual and online website, http://web.archive.Org/web/20090323171356/http://classic.battle.net/diablo 2exp/items/basics.shtml, 51 pages.

Path of Exile, Internet posting: http://web.archive.org/web/20120606004658/http://www.pathofexile.com/forum/view-thread/12056, Nov. 16, 2011, 52 pages.

MapleStory—Guides—Equipment Upgrading 101: Scrolls, URL: maplestory.nexon.net/guides/game-play/systems/OOFFV/#mitigating [Retrieved Jun. 24, 2013], 4 pages.

MapleStory—Guides—Equipment Upgrading 101: Potentials, URL: maplestory.nexon.net/guides/game-play/systems/OOFIj/ [Retrieved Jun. 24, 2013], 5 pages.

(56) References Cited

OTHER PUBLICATIONS

Dreamslayer's Enchanting and Upgrading Guide—With Pictures:D and Explanations, URL: forums.elswordonline.com/Topic5673. aspx [Retrieved Feb. 21, 2013], 10 pages.
The Arreat Summit—Items: Basic Item Information, URL: web. archive.org/web/20090323171356/http://classic.battle.net/diablo2exp/items/basics.shtml [Retrieved Feb. 21, 2013], 3 pages.
Elsword—Wikipedia, the free encyclopedia, URL: en.wikipedia. org/wiki/Elsword [Retrieved Feb. 21, 2013], 6 pages.
Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
Super Mario Bros. 3, StrategyWiki, the video game walkthrough and strategy guide, http://strategywiki.org/wiki/Super_Mario_Bros._3, 4 pages.
MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.
"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.
"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.
Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1-14-29-Hamari,Lehdonvirta.pdf, on May 26, 2015, 16 pages.
"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.
MapleStory—Guides—Equipment Upgrading 101: Enhancements, URL: maplestory.nexon.net/guides/game-play/systems/OOFlk; [Retrieved Jun. 24, 2013] 3 pages.
Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.
Ozeagle, "What happens if . . . answers about account types" on Lotro forum, Jan. 18, 2011,<https://www.lotro.com/forums/showthread.php?377885-What-happens-if-answers-about-the-account-types> (16 pgs).
<http://lotro-wiki.com/index.php?title=Ouest:A_Little_Extra_Never_Hurts_—_Part_2&oldid=399366>, <http://lotrowiki.com/index.php ?title=Getting_ Started&oldid=349681 >. Links are to used articles. (7 pgs) Feb. 26, 2014.
"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>.
"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.
"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_—_Part_ 1 &oldid=399597>, 3 pages.
"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_—_Part_2&oldid=399366>, 2 pages.
"Getting Started" written by BoD, published on Oct. 13, 2011 and printed from URL <http://lotrowiki.com/index.php?title=Getting_Started&oldid=349681 >, 5 pages.
"Lotro Store" written by Elinnea, published on Dec. 15, 2011 and printed from URL <http://lotrowiki.com/index.php ?title= LOTRO _ Store&oldid=396550>, 23 pages.
"Main Page" written by Starbusty, published on Dec. 12, 2011 and printed from URL <http://lotrowiki.com/index.php?title=Main_Page&oldid=394429>, 2 pages.
New Feature: Tiered Tournaments and Tournament Updates, printed from http://community.kabam.com/forums/showthread.php?171349-New-Feat on Feb. 11, 2014, 2 pages.
Wikipedia, Mafia Wars, <http://en.wikipedia.org/wiki/Mafia_Wars>, Jan. 28, 2012, 3 pages.

* cited by examiner

CUSTOMIZED CHANCE-BASED ITEMS

FIELD OF THE DISCLOSURE

This disclosure relates to distributing virtual items to users in an online game.

BACKGROUND

Users may access virtual spaces via client computing platforms. A virtual space may include an online game taking place within the virtual space. Virtual items usable within the virtual space and/or online game taking place within the virtual space may be distributed to users through various mechanisms. Virtual items may include one or more of a virtual weapon, a tool, a food, a currency, a reward, a bonus, health, a potion, an enhancement, a mount, a power-up, a speed-up, clothing, a vehicle, an anatomical feature of a character or game entity, a troop or troop type, a pet, a virtual resource, and/or other virtual items and/or goods.

Virtual items may be distributed to users via probability item bundles offered for sale through a virtual shop interface. Probability item bundles may be associated with a set of potential awards. The potential awards included in the set of potential awards may be individually associated with a probability of being distributed (e.g., won) once the probability item bundle is activated by a user.

SUMMARY

One aspect of the disclosure relates to a system for facilitating user customization of the distribution of virtual items in an online game. A user's gameplay experience may be enhanced through their interaction with the virtual items which are usable in the online game. Certain items may help the users to complete levels, obtain upgrades and achievements, and/or enhance other modes of gameplay. Users may obtain the virtual items by various mechanisms. Users may purchase the virtual items directly from a virtual shop, acquire the virtual items through gameplay (e.g., as an upgrade, bonus, reward, or the like), win virtual items through chance based distribution mechanisms, and/or other considerations for obtaining virtual items. In particular, chance based distribution may be particularly desirable in that users are given the opportunity to win one or more virtual items, often for less than the face value of the item. However, since there is also the chance that the user will not win the item they desire, such chance based distribution mechanisms may become boring or otherwise undesirable ways for obtaining virtual items. As such, the disclosure herein describes a system in which users can customize how virtual items are distributed in the online game to further increase engagement with one or more of the distribution mechanisms, enhance their overall gameplay experience, and/or provide other enhancements.

The system may comprise one or more physical processors configured to execute one or more computer components. The computer program component may include one or more of a game component, a virtual shop component, a customization component, a distribution probability component, a bundle activation component, a user preference component, offer component, and/or other components.

The game component may be configuring to execute an instance of a virtual space and/or an online game taking place within the virtual space. Executing the instance of the virtual space and/or online game may include implementing the instance of the virtual space and/or online game to facilitate participation of users in the virtual space and/or online game. The users may participate in the virtual space and/or online game through client computing platforms. The game component may host the online game for the client computing platforms in a client/server configuration.

The virtual shop component may be configured to effectuate presentation of offers to sell probability item bundles (e.g., a chance based distribution mechanism) to users for consideration through a shop interface. A given probability item bundle may be associated with a set of potential awards. The individual potential awards may include virtual items usable in the online game. The individual potential awards may be associated with distribution probabilities such that users who activate the probability item bundle have a chance to win one or more of the potential awards included in the set of potential awards.

The customization component may be configured to facilitate customization of probability item bundles offered for sale through the shop interface. Customization of the probability item bundle may allow users to choose the potential awards they want to be included in the probability item bundle. In particular, users may purchase more probability item bundles if they know at least one of the items included in the probability item bundle for them to win. Customization may be facilitated by receiving entry and/or selection by users of one or more of the potential awards for inclusion in probability item bundles. Entry and/or selection may be received through a customization interface presented to the users.

The distribution probability component may be configured to determine distribution probabilities for the potential awards included in sets of potential awards of customized probability item bundles that have been selected and/or entered by users. The distribution probabilities of the individual potential awards may define the probability that the users will win that particular award when the probability item bundle is activated, thus providing the element of chance (e.g., determined as a percentage). For example for a first customized probability item bundle having a first set of potential awards that includes at least one potential award entered and/or selected by a first user, the distribution probability component may be configured to determine distribution probabilities for the potential awards included in the first set of potential awards. In some embodiment the distribution probability component may be configured to determine distribution probabilities based on user entry and/or selection of distribution probabilities for the potential awards included in the set of potential awards.

The bundle activation component may be configured to distribute potential awards to the users that activate instances of the customized probability item bundles. The distributions may be made in accordance with the determined distribution probabilities (e.g., determined by the distribution probability component).

The user preference component may be configured to store and/or save the sets of potential awards included in the customized probability item bundles. Stored sets of potential awards may be made available for access by the users during subsequent customizations of probability item bundles. For example, the user preference component may be configured to store the first set of potential awards selected by the first user for the first customized probability item bundle such that the first set of potential awards is available for access by the first user during customization of subsequent probability item bundles.

The offer component may be configured to generate custom offers to sell virtual items and/or sets of virtual items to users through the shop interface. The custom offers may include offers to sell instances of one or more of the individual potential awards included in the sets of potential awards of the customized probability item bundles selected by the users. For example, the potential awards selected by the users are typically awards that the user may otherwise purchase at face value, however they choose to try and win the award through the probability item bundle since the probability item bundle may be sold at less than the face value of any one of the individual potential awards. By storing the user selections, the offer component can determine which virtual items are most desirable to the users, and generate custom offers to sell them to the users, for example, at a discounted price.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
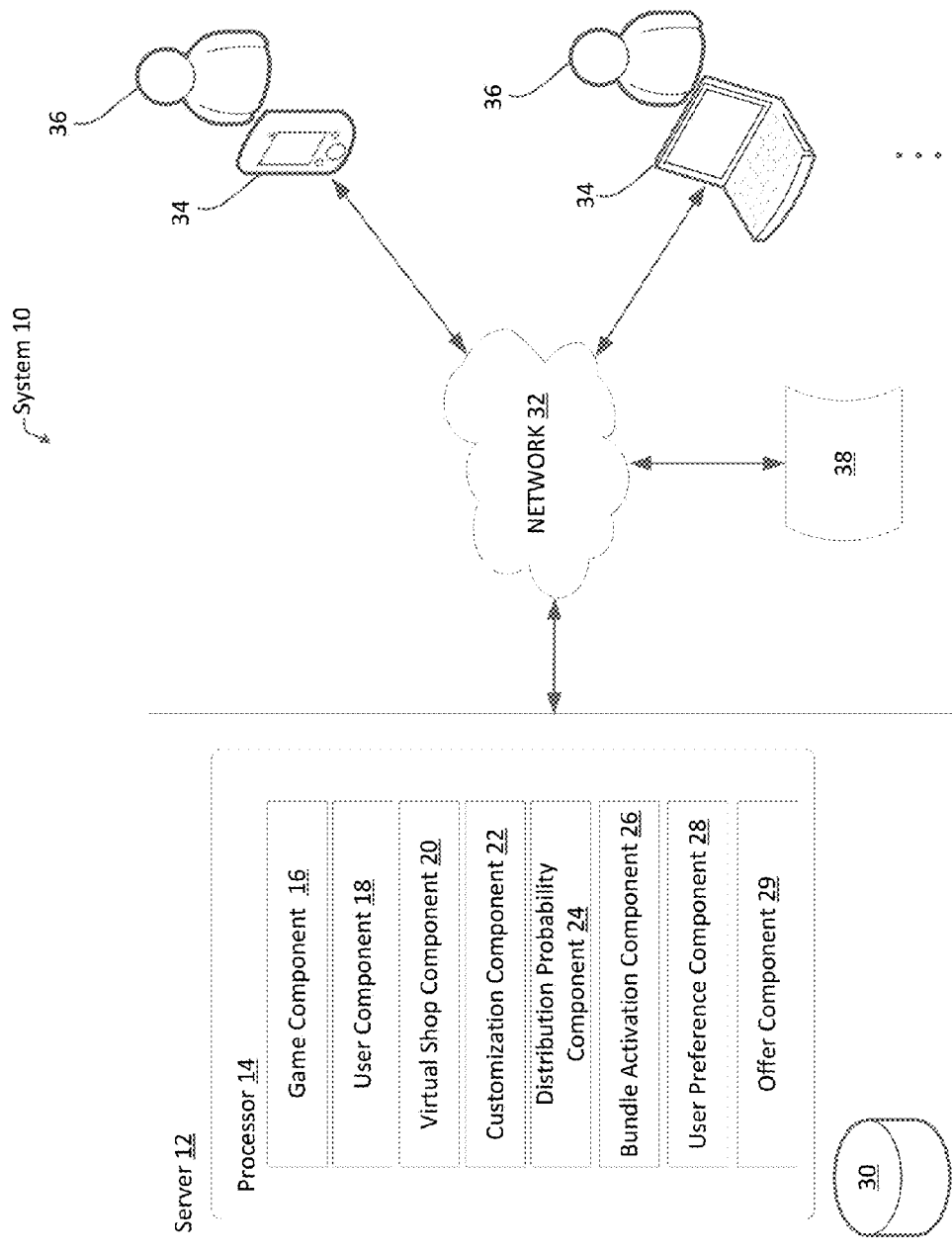
FIG. 1 illustrates a system for user customized distribution of virtual items within a virtual space.

FIG. 1 illustrates a system 10 configured to facilitate user customization of the distribution of virtual items in a virtual space. A virtual space may include, for example, an online game taking place within the virtual space. Virtual items may refer to virtual items which are usable within the online game. Virtual items may be distributed to users of the virtual space by one or more distribution mechanisms. Distribution mechanisms may include direct sale of virtual items to the users via a virtual shop interface, through chance-based distribution, and/or other by techniques for distributing virtual items to users of the virtual space. The system 10 herein may enhance a user's gameplay experience by facilitating user customization of one or more of the virtual item distribution mechanisms.

Virtual items (also referred to as virtual goods) may include one or more of a virtual weapon, a tool, a food, a currency, a reward, a bonus, health, a potion, an enhancement, a mount, a power-up, a speed-up, clothing, a vehicle, an anatomical feature of a character or game entity, a troop or troop type, a pet, a virtual resource, and/or other virtual items and/or goods. Virtual items and/or virtual goods may be usable within the virtual space and/or an online game that takes place in the virtual space.

Chance based distribution may refer opportunities for users to acquire and/or win one or more virtual items by chance. Chance based distribution may include, for example, a chance based game having an award or prize for the winner, a probability item bundle which is sold (e.g., through a virtual shop) or otherwise acquired by the users of the virtual space, and/or other chance based distribution mechanism.

Probability item bundles may refer to a virtual item sold through a virtual shop and/or distributed to users of the virtual space which provides the users the chance to acquire (e.g., win) one or more potential awards included in the probability item bundle. The awards may be distributed based on a distribution probability. Virtual awards may include one or more virtual items as described herein, and/or other virtual space content. For example, instances of probability item bundles may be associated with sets of potential awards and/or instances of potential awards that are usable in the virtual space. The probability item bundles may be associated with distribution probabilities for the individual potential awards included in the sets of potential awards.

The potential awards included in the set of potential awards may be individually associated with a probability of being distributed once the probability item bundle is acquired (e.g., purchased) and/or activated by a user. The sets of potential awards may include at least one primary award and a set of secondary awards (e.g., one or more secondary awards). Primary awards may be virtual items which are associated with a generally higher value and/or sale price than the virtual items included in the set of secondary awards. An instance of a probability item bundle may be offered for sale such that a user who buys the instance of the probability item bundle has a chance to win one or more of the potential awards included in the set of potential awards. In some implementations, the primary awards may be associated with a relatively lower probability of being won, and the secondary awards may be associated with a relatively higher probability of being won. The quantity and type of virtual items contained within a probability item bundle, as well as the individually associated probabilities, may or may not be known or displayed to the purchaser (e.g., displayed in the virtual shop interface). In some implementations, a probability item bundle may be represented in the virtual space as a mystery box, virtual container, chest, package, or other item(s) within the virtual space that at least "appears" to store or contain one or more virtual awards or other content.

Chance based games may refer to games which are playable within the virtual space where one or more awards (e.g., winning prizes) are be distributed to one or more users (e.g., winning player) based on a probability of the game being won (e.g., as opposed to skills based game). Examples of chance based games may include, for example, virtual slots, virtual blackjack, virtual roulette, and/or other games of chance.

The system 10 herein may be configured to enhance a user's gameplay experience by facilitating customization of the distribution of virtual items through probability item bundles sold through the virtual shop, and/or one or more other chance base distribution mechanisms described herein.

In FIG. 1, providing the virtual space may include hosting the virtual space over a network 32, such as the Internet. A host server may include one or more processors configured to execute one or more computer components for implementing an instance of an online game and to facilitate the participation of one or more users in the online game. The host server may be a game server 12. The server 12 may include processor(s) 14.

The computer program components may include one or more of a game component 16, a user component 18, a virtual shop component 20, a customization component 22, a distribution probability component 24, a bundle activation component 26, a user preference component 28, offer component 29, and/or other components. The server 12 may be configured to communicate with one or more client computing platforms 34, according to client/server architecture. The client computing platforms 34 can include, for example, a cellular telephone, a smartphone, a laptop, a tablet computer, a desktop computer, a television set-top box, smart TV, a gaming console, and/or other device as described herein and/or other considerations. The users 36 may access system 10 and/or the virtual space via client computing platforms 34.

The game component 16 may be configured to implement an instance of the virtual space executed by the computer components to determine state of the virtual space. The state may then be communicated (e.g., via streaming visual data, via object/position data, and/or other state information) from server 12 to client computing platforms 34 for presentation to users 36. The state determined and transmitted to a given client computing platform 34 may correspond to a view for a user character being controlled by a user 36 via input devices (e.g., a controller) at the given client computing platform 34. The state determined and presented to a given client computing platform 34 may correspond to a location in the virtual space (e.g., location in the game). The view described by the state for the given client computing platform 34 may correspond, for example, to the location from which the view is taken, the location the view depicts, and/or other locations, a zoom ratio, a dimensionality of objects, a point-of-view, and/or view parameters of the view. One or more of the view parameters may be selectable by the users 36.

An instance of the virtual space may comprise a simulated space that is accessible by users 36 via clients (e.g., client computing platforms 34) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which state of the virtual space is determined by game component 16 is not intended to be limiting. The game component 16 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game component 16, users 36 may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user 36 with which it is associated. The user controlled element(s) may move through and interact with the virtual space (e.g., non-user characters in the virtual space, other objects in the virtual space). The user controlled elements controlled by and/or associated with a given user 36 may be created and/or customized by the given user.

The users may participate in the instance of the virtual space by controlling one or more of the available user controlled elements in the virtual space. Control may be exercised through control inputs and/or commands input by the users through client computing platforms 34. The users may interact with each other through communications exchanged within the virtual space. Such communications may include one or more of textual chat, instant messages, private messages, voice communications, and/or other communications. Communications may be received and entered by the users 36 via their respective client computing platforms 34. Communications may be routed to and from the appropriate users through server 12 (e.g., through game component 16) and/or through communications which are external to the system 10 (e.g., text messaging services associated with the client computing platforms 34).

The instance of the virtual space and/or the online game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, changes to the virtual items available for use in the online game, and/or other changes.

The user component 18 may be configured to access and/or manage one or more user profiles and/or user information associated with users of the system 10. The one or more user profiles and/or user information may include information stored by server 12, one or more of the client computing platforms 34, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual (or real) currency account information (e.g., related to currency held in credit for a user), relationship information (e.g., information related to relationships between users in the virtual space), virtual space usage information (e.g., a log-in history indicating the frequency and/or amount of times the user logs-in to the user accounts), demographic information associated with users, interaction history among users in the virtual space, information stated by users, browsing history of users, a client computing platform identification associated with a user, a phone number associated with a user, and/or other information related to users. The user information may include inventories of virtual items available for use by the users in the online game (e.g., previously acquired virtual items).

The virtual shop component 20 may be configured to effectuate presentation of offers to sell instances of virtual items usable in the virtual space to users in a shop interface. The virtual shop component 20 may be configured to effectuate presentation of offers to sell probability item bundles to users for consideration through the shop interface. As presented herein, a given probability item bundle may be associated with a set of potential awards, wherein the individual potential awards include virtual items usable in the game which are associated with distribution probabilities. The virtual shop component 20 may be configured to effectuate presentation of offers for other virtual space content. Offers may be realized using one or more of virtual currency and/or real currency.

The virtual shop may be a simulated environment within the virtual space which is accessible by users and presents the views of the virtual shop to the users. Users may access the virtual shop through one of a variety of ways. Users may access the virtual shop through the manipulation of one or more user characters associated with the user within the virtual space using control inputs and/or commands input by the users through client computing platforms, and/or other way of access.

Manipulation of a character may include moving the one or more user characters through the virtual space using control inputs and/or commands input by the users through client computing platforms, to move the one or more characters to the simulated environment designating the location of the virtual shop within the virtual space.

Users may use control inputs and/or commands not associated with the one or more user characters to access the virtual shop. Control inputs and/or commands may automatically present the instance of the game shop on the clients computing platforms (e.g., user selects a virtual shop button to automatically be taken to the game shop).

The instance of the virtual shop may be presented to users through a shop interface. The shop interface may be configured to present the offers to sell virtual items and/or probability item bundles to users. The shop interface may be configured to receive entry and/or selection of individual offers by the users to effectuate acceptance and/or purchase of the offers at a virtual (or real) currency purchase price.

The simulated environment of the virtual shop may have topography. The virtual shop may express ongoing real-time interaction by one or more users (e.g., may have limited stock of virtual items for sale which can be purchased by one or more users within the virtual space which can be depleted), and/or include one or more objects (e.g., one or more virtual items, a virtual teller, and/or other objects) positioned within the topography that may be capable of locomotion within the topography. The virtual shop may display the items, and/or the one or more sets of virtual items available for purchase by the users. Users may view the virtual items and/or one or more sets of virtual items available for purchase. Users may purchase the virtual content using virtual (or real) currency. Transactions may take place with the virtual teller, through various other actions of the user within the instance of the virtual shop, and/or other offer/transaction mechanisms.

The customization component 22 may be configured to facilitate user-customization of the chance based distribution of virtual items in the virtual space. For example, in some implementations, the customization component 22 may be configured to facilitate user customization of probability item bundles offered for sale through the shop interface. In some implementations, the customization component 22 may be configured to facilitate user-customization of the potential awards offered via chance based games.

In some implementations, customization of probability item bundles offered for sale through the shop interface may be facilitated by receiving entry and/or selection by users of at least one of the potential awards to be included in the set of potential awards of a probability item bundle. For example, a user may select one or more of the primary awards and/or one or more of the secondary awards included in the probability item bundle. In some embodiments described herein, users may select the distribution probability of one or more of the selected awards included in the set of potential awards.

In some embodiments, the customization component 22 may be configured to restrict the inclusion of potential awards selected for the customized probability item bundles. Restriction may include, for example, selling the probability item bundle at a flat rate and restricting the type (e.g., primary and secondary) and/or quantity of the potential awards which can be included in the customizable probability item bundle, limiting the total value of the customized probability item bundle (e.g., as determined by the summed individual values of the awards selected by the user), by adjusting the final purchase price of the probability item bundle based on the user selected potential awards, and/or other technique for restriction. As such, in some embodiments, the purchase price of the probability item bundle being customized may be determined after the user has selected the desired potential awards, such that the user can tailor the customization to a desired price prior to effectuating purchase (e.g., debiting currency from their currency account).

Figure 3:
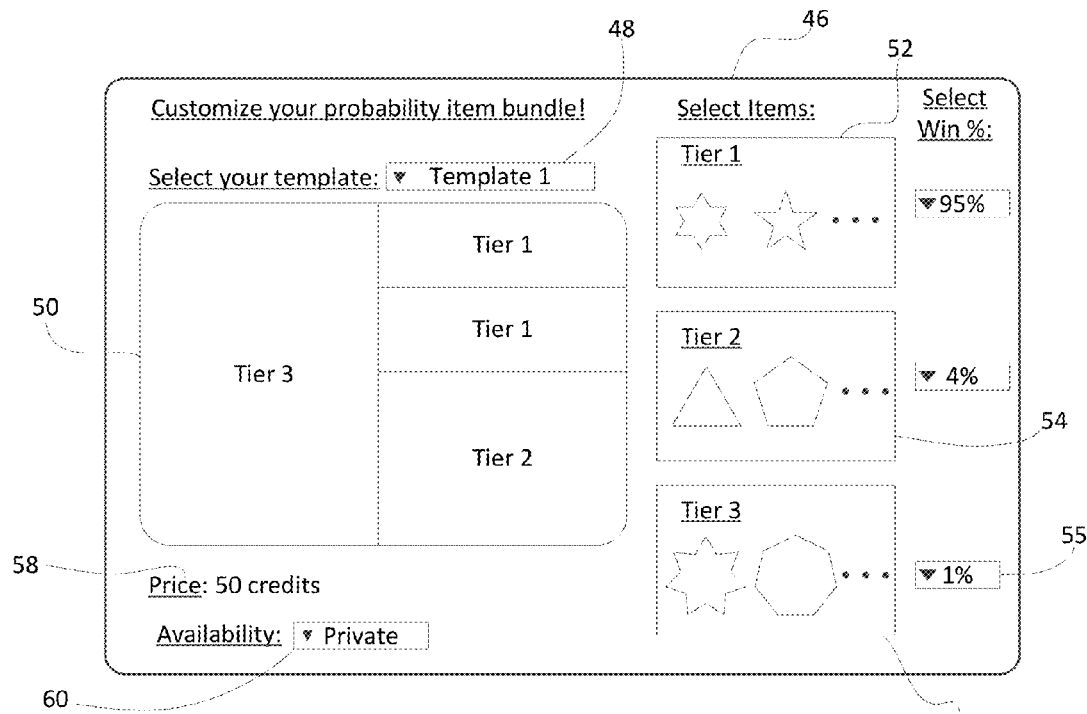
FIG. 3 illustrates an embodiment of a user interface for customizing a chance based item.
Figure 4:
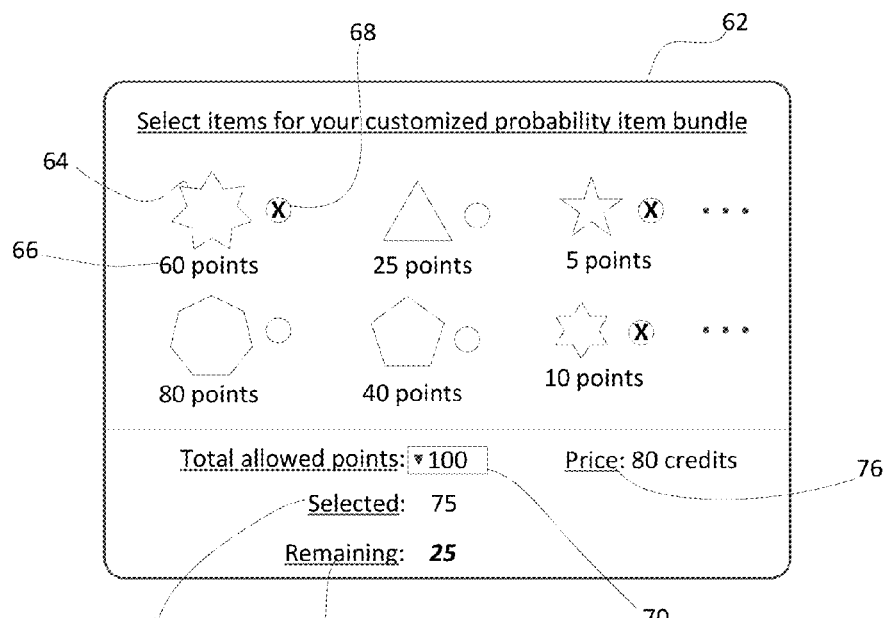
FIG. 4 illustrates another embodiment of a user interface for customizing a chance based item.

The customization component 22 may be configured such that facilitating customization of probability item bundle comprises effectuating presentation of one or more customization interfaces, such as the interfaces shown in FIG. 3 and FIG. 4 and described herein. The customization interfaces may be configured to receive the user entry and/or selection of at least one potential award included in the sets of potential awards of the customized probability item bundles. In some embodiments, users may make selections of all of the potential awards included in the sets of potential awards. In some embodiments, users may select some of the potential awards included in the sets of potential awards (e.g., the primary award and some of the secondary awards), wherein some of the potential awards are pre-selected and/or standard awards to be included in the set (e.g., the remaining secondary awards).

FIG. 3 shows an exemplary embodiment of a customization interface 46 configured to receive user entry and/or selection of one or more potential awards to be included in a customizable probability item bundle purchase through the shop interface. The customization interface 46 may facilitate restricting user selection of potential awards for the inclusion in the set of potential awards of the customized probability item bundle through one or more various techniques. In one embodiment, restricting user selection potential awards may include ranking the potential awards to a multi-tier ranking system. The system 10 may then be configured to restrict the quantity of potential awards which can be included in the set of potential awards of the customized probability item bundle from each ranked tier.

For example, potential awards may be assigned to one or more of a Tier 1 ranking 52, a Tier 2 ranking 54, and a Tier 3 ranking 56 of which the user can select one or more items from. For illustrative purposes only, potential awards of a higher value (e.g., a primary awards) may be assigned to a Tier 3 ranking, while relatively more common or lesser value items (e.g., secondary awards) may be assigned to a Tier 1 or Tier 2 ranking. It is noted that the descriptions provided herein related to the multi-tier ranking system are for illustrative purposes only and are not intended to be limiting. For example, potential awards may be ranked on more or less tiers then shown, and/or may be assigned rankings based on other qualitative and/or quantitative measures.

Customization interface 46 may facilitate user selection of potential awards employing this or a similar multi-tiered ranking system by restricting the quantity of potential awards which can be include in the customized probability item bundle from each tier. As an illustrative example in FIG. 3, the customization interface 46 may include a template 50 for selecting potential awards to be included in the set of potential which indicates potential award tier "slots" corresponding to the allowable inclusion of potential awards. As currently show, the template 50 may include slots that indicate that the probability item bundle is restricted to one item from Tier 3, one item from Tier 2, and two items from Tier 1. Users may select potential awards from the respective tiers 52, 54, 56 though "drag and drop" selection, and/or other suitable technique for selecting the appropriate potential awards.

The depiction of the template 50 shown is for illustrative purposes only and should not be considered limiting. It is envisioned that customizable probability item bundles may include more or less "slots" indicating the tier of item which can be selected for inclusion. For example, a customizable probability item bundle template may be configured with "slots" for more than one Tier 3 and/or additional Tier 2 and Tier 1 awards. It is envisioned that the cost of the probability item bundle may reflect the number of slots and/or the types of potential awards which can be selected for that probability item bundle. For example, a customizable probability item bundle template having more "slots" for Tier 3 awards may be more expensive than a customizable probability item bundle template having only one "slot" for a Tier 3 award.

In some embodiments, the customization interface 46 may be configured to allow users to select from a plurality of pre-stored templates, for example, through a drop down menu 48 and/or other selection interface. Different pre-stored templates may include different combinations of slots for different tiered awards which can be included in the instance of the customizable probability item bundle. The different templates may be associated with a different sales price 58 (e.g., in virtual currency, credits, real currency, etc.). In some embodiments, users may be able to purchase additional "slots" for the pre-stored templates. For example, a user may select a pre-stored template, and customize the template with more or less slots for an additional fee.

In some embodiments, the customization component 22 (FIG. 1) may be configured such that facilitating customization of probability item bundles comprises adjusting the purchase price of the probability item bundle based on the user selection of potential awards. The customization component 22 (FIG. 1) may be configured such that users may tailor the customization of the probability item bundles through the customization interface 46 to a particular price and/or price range. For example, the customization interface 46 (FIG. 1) may be configured such that with or without the use of a template 50, the user can select the desired potential awards to be included in the set of potential awards and the final sales price 58 of the probability item bundle will dynamically adjust accordingly. Again, it is envisioned that a customized probability item bundle having more higher value items (e.g., multiple Tier 2 and 3 awards) will generally be sold at a relatively higher sales price than customized probability item bundles having fewer higher value items.

In some embodiments, the customization component 22 (FIG. 1) may be configured such that users can select the distribution probabilities of one or more of the selected potential awards included in the set of potential awards. Selection of distribution probabilities may be facilitated through one or more of the techniques described herein, and/or by other considerations.

Referring to FIG. 3, the customization interface 46 may include one or more drop down menus 55 and/or other selection mechanism configured to facilitate user selection of the distribution probabilities of the individual potential awards included in the set of potential awards of the customized probability item bundle. For example, the drop down menu 55 may include a range of distribution probability values which the user can select from when adding a virtual item to the template 50. In some embodiments, higher value items (e.g., Tier 3 items) may be restricted to lower distribution probabilities (e.g., 1-3%), while lesser value items (e.g., Tier 2 and 1 items) may correspond to higher distribution probabilities (e.g., 4-10% and 90-99%, respectively).

Returning to FIG. 1, in some embodiments, the customization component 22 may include restrictions related to selection of distribution probabilities of the individual potential awards. Restrictions may include one or more of an increase in total sales cost of the customized probability item bundle, and/or restrictions in the selection of other potential awards to be included in the set of potential awards. In some embodiment, the sales price of the customized probability item bundle may adjust according to user selections of distribution probabilities. For example, if a relatively high distribution probability (e.g., greater than 5%, 10% or other probability) is selected for a high value Tier 3 item, the cost of the probability item bundle may increase accordingly (for example, as a percentage of the actual individual sale price of the high value item). As another example, if a relatively high distribution probability is selected for a high value Tier 3 item, the remaining "slots" available for other potential awards in the set of potential awards may be restricted to only allow low value Tier 1 items (e.g., the probability item bundle will include the one high value item with a user selected relatively high distribution probability and one or more low value items corresponding to the remaining distribution probabilities). Other restrictions related to users selecting distribution probabilities for individual potential awards are also contemplated.

In some embodiments, the customization component 22 may be configured such that at least the primary awards included in the set of potential awards may be associated with a user selectable distribution probability. In embodiments where users do not customize distribution probabilities, determination of distribution probabilities may be determined by the distribution probability component 24 as described herein. It is noted that the above descriptions of user customization of the distribution probabilities of the potential awards included in the set of potential awards of instances of customized probability item bundles are provided as illustrative examples only and are not to be considered limiting. Customization of distribution probabilities may be carried out in other ways or by other techniques.

FIG. 4 shows another embodiment of a customization interface 62 configured to receive user entry and/or selection of one or more potential awards to be included in the set of potential awards for a customizable probability item bundle. Restricting user selection of the potential awards included in the sets of potential awards of the customized probability item bundles may include assigning point values 66 to each of the selectable potential awards 64, and setting threshold total point values 70 for the sets of potential awards included in the instance of the customized probability item bundle. The threshold total point value 70 of a customizable probability item bundle may correspond to the summed point values 66 of the potential awards 64 selected 68 by a user to be included in the set of potential awards. For example, users may purchase a customizable probability item bundle at a price 76 which reflects the threshold total point value 70 allowable for that probability item bundle. Users may tailor the customization by increasing and/or decreasing the threshold total point value, for example, via a drop down menu presented on the customization interface 62. In the latter, the price 76 of the probability item bundle may dynamically change based on the threshold total point value chosen by the user.

In some embodiments, the customization interface 62 may include depictions of potential awards 64 available for selection 68, and their corresponding point values 66. The point values 66 may be assigned to the various potential awards based on the type of potential award (e.g., a primary awards generally assigned to a higher point value compared to secondary awards), the rarity of the award, and/or other qualitative and/or quantitative measure for assigning point values to potential awards. By assigning higher value items higher point values, the user is generally restricted to fewer higher value items based on the total allowable points 70. User may select 68 potential awards. Selection 68 may be facilitated by check boxes, highlighting desired awards, and/or other selection technique suitable for the intended purpose. The summed point value 72 of the selected items may be displayed on the customization interface 62. The remaining points 74 available for allocation (e.g., threshold total point value minus the summed point values of currently selected awards) may also be displayed to guide the user in potential award selection.

The above descriptions and associated figures of embodiments of customization interfaces are provided for illustrative purposes and are not intended to be limiting. In some embodiments, customization of probability item bundles may include more or less restrictions related to the selection of the potential awards included in the set of potential awards of the customized probability item bundle which may or may not be reflected on an interface presented to the users to facilitate such customization.

Figure 2:
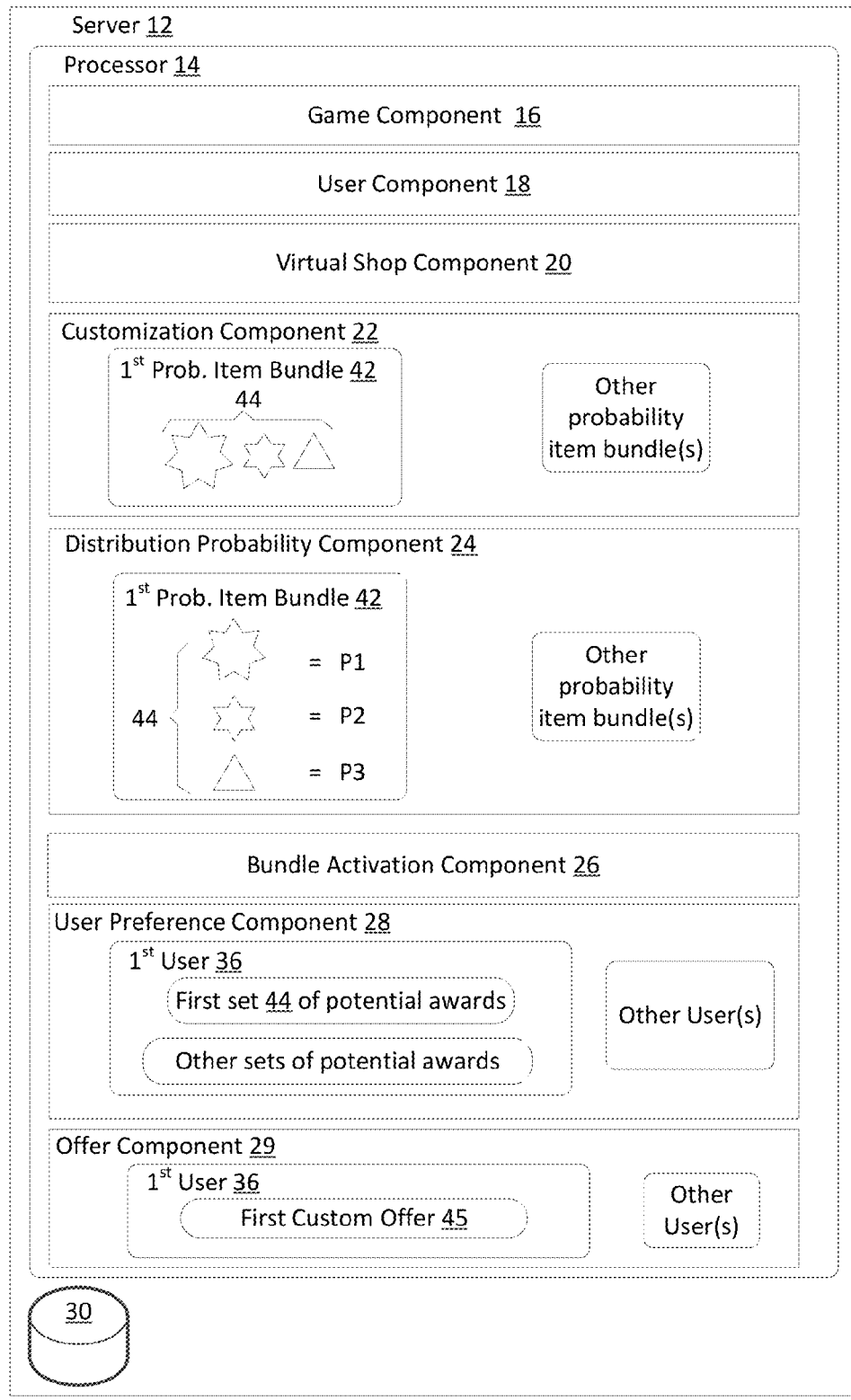
FIG. 2 illustrates a particular embodiment of the server employed in the system depicted in FIG. 1.

As an illustrative example in FIG. 2, the customization component 22 may be configured to facilitate user customization of a first probability item bundle 42 offered for sale through the shop interface. The user may select, for example, one or more potential awards included in a first set 44 of potential awards associated with the first probability item bundle 42. The first set 44 may include at least one primary award and one or more secondary items. The first set 44 may be selected by a first user through a customization interface, the same or similar to customization interfaces shown in FIG. 3 and FIG. 4.

Returning to FIG. 1, the distribution probability component 24 may be configured to determine distribution probabilities for the potential awards included in sets of potential awards of customized probability item bundles. In some implementations, the probabilities are distributed such that at least one potential award will be awarded to the user when the probability item bundle is activated (e.g., the probabilities of the potential awards added together equal %100). The primary items included in the sets of potential awards may be associated with a relative low probability of being awarded (e.g., won) compared to the probability distribution for the secondary items. In some embodiments, the distribution probability may be known to the users (e.g., displayed prior to, during and/or after customization). In some embodiments, the distribution probability may be unknown to the users.

In some embodiments, the distribution probability component 24 may be configured to determine distribution probabilities for the individually selected potential awards based on user selection of the distribution probabilities as described previously herein (e.g., via the customization interface). Other distribution probability determinations are contemplated.

As an illustrative example in FIG. 2, the distribution probability component 24 may be configured to determine distribution probabilities for the potential awards included in the first set 44 of potential awards of the first customized probability item bundle 42 (e.g., P1, P2, and P3). In some implementations, the probabilities are distributed such that at least one potential item will be won (e.g., P1+P2+P3=%100). It is to be understood that although the first set 42 includes three potential awards, sets of potential awards included in probability item bundles may include more or less awards.

Returning to FIG. 1, the bundle activation component 26 may be configured to distribute potential items to the users that activate instances of the customized probability item bundles in accordance with the determined distribution probabilities. Activation may be considered the time the customization is complete and the purchase is finalized (e.g., all potential awards have been selected and the funds are successfully withdrawn from the purchasers account). Activation may be considered the time the user actually uses (e.g., opens) the probability item bundle (e.g., the probability item bundle may be purchased and then stored in a user's inventory and used at a later time). Activation may be considered in other ways.

The user preference component 28 may be configured to store the sets of potential awards included in the customized probability item bundles such that the stored sets of potential awards are available for access by the users during subsequent customizations of probability item bundles and/or for direct purchase through the shop interface. For example, a set of potential awards selected by a user for a instance of a customized probability item bundle may be stored such that each time the user (and/or other users) reenters the shop interface to customize or purchase a probability item bundle, the stored set of potential items may be displayed and/or made available to the user. In this manner, if a user wishes to purchase a probability item bundle having the same or similar set of awards they previously selected for a customized probability item bundle, the previously selected set may be stored and readily available (e.g., as opposed to the user having to re-select the set of potential awards through a customization interface). Sets of potential awards selected by users for customized probability item bundle may be stored and shareable between other users of the system. In some implementations, during customization, the users may specify if the probability item bundle they are customizing is a "preferred" customization, such that the set of potential awards may be saved as described herein.

As an illustrative example, referring to the embodiment of the customization interface 46 shown in FIG. 3, the customization component 22 may be configured such that users can select and/or enter a preference of availability of the set of potential awards selected for a customized probability item bundle. For example, a drop down menu 60 (and/or pop up window or other selection mechanism) can be employed where the user can select "One-time" for a single use of the probability item bundle (e.g., the set of potential awards is not stored after customization), "Private" to store the selected set of potential awards for personal use (e.g., not shared with other users), "Public" to store the selected set of potential awards for shared use, "Share" where the users can specify specific users to share the selected set of potential awards with, and/or other user selected preferences regarding the storage of the selected set of potential awards included in the customized probability item bundles.

In implementations where sets of potential awards are stored for sharing with other users, probability item bundles including the sets of potential awards may be made available for purchase through the shop interface. In this manner, users may customize probability item bundles and share these customizations with other users, provide feedback to each other, and enhance their gameplay experience.

For example, returning to FIG. 2, the user preference component 28 may be configured to store the first set 44 of potential awards selected by the first user 36 for the first customized probability item bundle 42 such that the first set 44 of potential awards is available for access by the first user (or other users) during customization of a second customized probability item bundle (not shown), and/or during subsequent visits to the shop interface.

Referring now to FIG. 1, the offer component 29 may be configured to generate customized offers to sell virtual items and/or sets of virtual items to users through the shop interface based on user selections of potential awards included in the sets of potential awards of the customized probability item bundles. For example, the offer component 29 may be configured to generate a customized offer to sell a particular high value virtual item (and/or other value item) to a user through the shop interface by virtue of the particular high value virtual item (and/or other value item) being selected for inclusion as a potential award in a customized probability item bundle purchased through the shop interface. In some embodiments, the custom offer may include an offer to sell the item at a discounted price. In some embodiments, the generation of a custom offer may be accompanied by a notification sent to the user internally and/or externally to the system 10 (e.g., in-game messaging, email, etc.) notifying the user of the custom offer.

By way of illustration in FIG. 2, the offer component 29 may be configured to generate a first custom offer 45 for the first user 36. The first custom offer 45 may include an offer to sell one or more of the virtual items to the first user 36 based on the potential awards included in the first set 44 of potential awards selected by the first user 36. In some embodiments, the first custom offer 45 includes an offer to sell an instance of the primary award (e.g., Tier 3 item) selected by the first user 36 for inclusion in the first set 44 of potential awards. Other offers may be generated.

Returning to FIG. 1, the server 12, client computing platforms 34, and/or external resources 38 may be operatively linked via one or more electronic communication links. For example, such electronic communication links may be established, at least in part, via a network 32 such as the Internet and/or other networks. It will be appreciated that this is not intended to be limiting, and that the scope of this disclosure includes implementations in which servers 12, client computing platforms 34, and/or external resources 38 may be operatively linked via some other communication media.

The external resources 38 may include sources of information, hosts and/or providers of virtual spaces outside of system 10, external entities participating with system 10, external entities for player-to-player communications, and/or other resources. In some implementations, some or all of the functionality attributed herein to external resources 38 may be provided by resources included in system 10.

The server 12 may include electronic storage 30, one or more processors 14, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 30 may comprise electronic storage media that electronically stores information. The electronic storage media of electronic storage 30 may include one or both of system storage that is provided integrally (i.e., substantially non-removable) with server 12 and/or removable storage that is removably connectable to server 12 via, for example, a port or a drive. A port may include a USB port, a firewire port, and/or other port. A drive may include a disk drive and/or other drive. Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 30 may include one or more virtual storage resources (e.g., cloud storage, a virtual private network, and/or other virtual storage resources). Electronic storage 30 may store software algorithms, information determined by processor 14, information received from server 12, information received from client computing platforms 34, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include one or more processing units. These processing units may be physically located within the same device, or processor 14 may represent processing functionality of a plurality of devices operating in coordination. The processor 14 may be configured to execute components 16, 18, 20, 22, 24, 26, 28, 29.

Processor 14 may be configured to execute components 16, 18, 20, 22, 24, 26, 28, 29 by software; hardware; firmware; some combination of software, hardware, and/or firmware; and/or other mechanisms for configuring processing capabilities on processor 14.

It should be appreciated that although components 16, 18, 20, 22, 24, 26, 28, 29 are illustrated in FIG. 1 as being co-located within a single processing unit, in implementations in which processor 14 includes multiple processing units, one or more of components 16, 18, 20, 22, 24, 26, 28, 29 may be located remotely from the other components. The description of the functionality provided by the different components 16, 18, 20, 22, 24, 26, 28, 29 described above is for illustrative purposes, and is not intended to be limiting, as any of components 16, 18, 20, 22, 24, 26, 28, 29 may provide more or less functionality than is described. For example, one or more of components 16, 18, 20, 22, 24, 26, 28, 29 may be eliminated, and some or all of its functionality may be provided by other ones of components 16, 18, 20, 22, 24, 26, 28 and/or 29 and/or other components. As another example, processor 14 may be configured to execute one or more additional components that may perform some or all of the functionality attributed below to one of components 16, 18, 20, 22, 24, 26, 28, 29.

Figure 5:
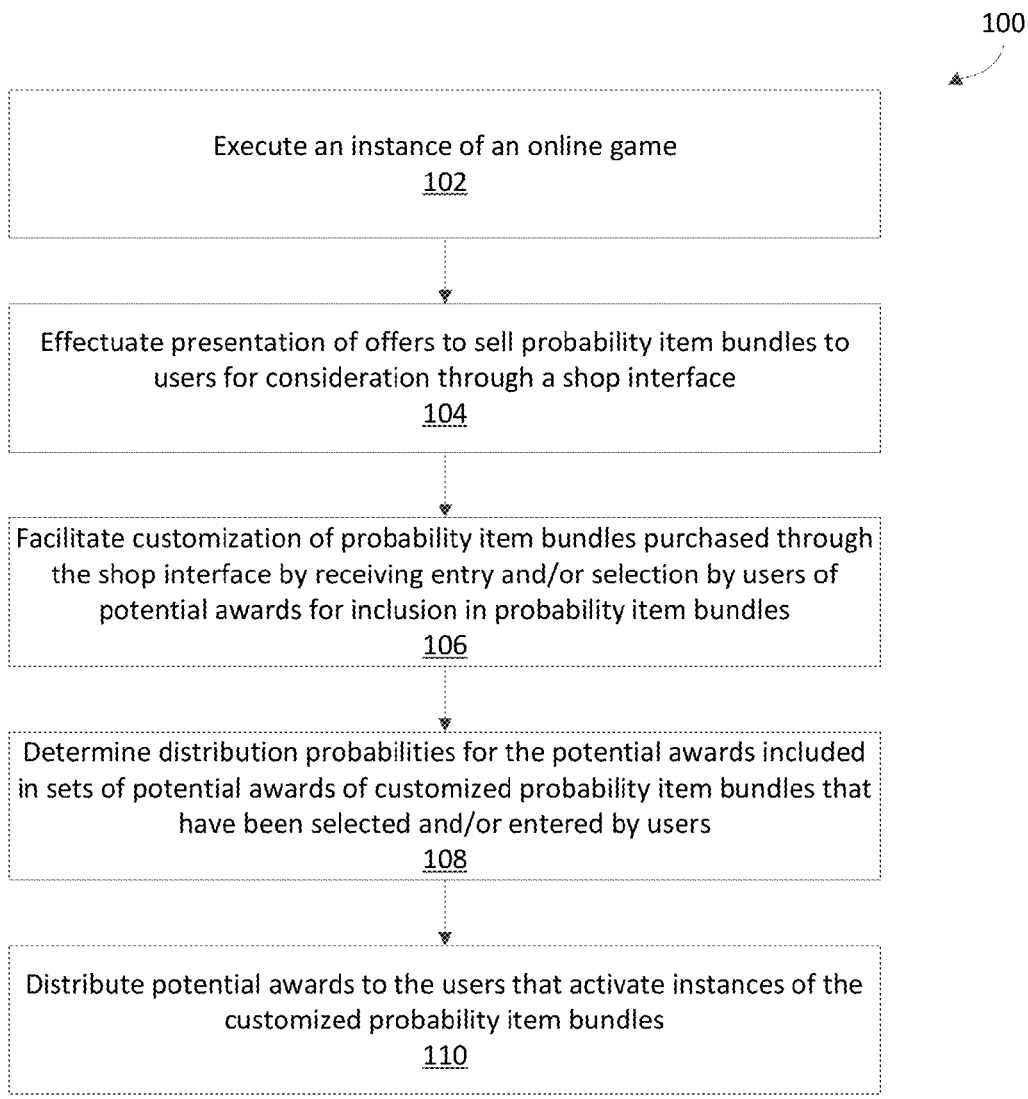
FIG. 5 depicts a method of distributing virtual items in a virtual space based on user customization.

FIG. 5 illustrates a method 100 of customizing the distribution of virtual items in a virtual space and/or an online game taking place within the virtual space. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 5 and described below are not intended to be limiting.

In some embodiments, method 100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

Referring now to method 100 in FIG. 5, at an operation 102, and instance of an online game may be executed. The instance of the online game may be implemented to facilitate participation of users in the online game. In some implementations, operation 102 may be performed by a game component the same as or similar to game component 16 (shown in FIG. 1 and described herein).

At an operation 104, the presentation of offers to sell probability item bundles to users for consideration through a shop interface may be effectuated. A given probability item bundle may be associated with a set of potential awards, wherein the individual potential awards include virtual items usable in the game and are associated with distribution probabilities. In some implementations, operation 104 may be performed by a virtual shop component the same as or similar to the virtual shop component 20 (shown in FIG. 1 and described herein).

At an operation 106, customization of probability item bundles offered for sale through the shop interface may be facilitated. Customization may be facilitated by receiving entry and/or selection by users of potential awards for inclusion in probability item bundles. In some implementations, operation 106 may be performed by a customization component the same as or similar to the customization component 22 (shown in FIG. 1 and described herein).

At an operation 108, distribution probabilities for the potential awards included in sets of potential awards of customized probability item bundles may be determined. For example, for a first customized probability item bundle having a first set of potential awards that includes at least one potential award entered and/or selected by a first user, the operation of determining distribution probabilities for the potential awards included in the first set of potential awards may be performed. In some implementations, operation 108 may be performed by a distribution probability component the same as or similar to the distribution probability component 24 (shown in FIG. 1 and described herein).

At an operation 110, potential awards may be distributed to the users that activate instances of the customized probability item bundles. Such distributions may be made in accordance with the determined distribution probabilities. In some implementations, operation 110 may be performed by a bundle activation component 26 the same or similar to the bundle activation component 26 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate user customization of distribution of virtual items in an online game, the system comprising:

one or more physical processors configured by computer-readable instructions to:

execute an instance of an online game, and to use the instance of the online game to generate game state information that is transmitted to client computing platforms over a network, the game state information facilitating presentation of views of the online game to users via the client computing platforms, wherein execution of the instance of the online game further enables participation of the users in the online game by performing operations in the instance in response to commands received over the network from the client computing platforms;

effectuate presentation of offers to sell probability item bundles to users for consideration through a shop interface, wherein a given probability item bundle is associated with a set of potential awards, wherein individual ones of the potential awards within the set of potential awards include virtual items usable in the online game and are associated with distribution probabilities;

facilitate customization of probability item bundles offered for sale through the shop interface by receiving entry and/or selection by users of potential awards for inclusion in probability item bundles such that entry and/or selection of at least one potential award by a first user is received and the at least one potential award entered and/or selected by the first user is included in a first set of potential awards associated with a first customized probability item bundle;

determine distribution probabilities for the potential awards selected and/or entered by users and included in sets of potential awards of customized probability item bundles such that distribution probabilities for the first customized probability item bundle having the first set of potential awards that includes the at least one potential award are determined; and distribute potential awards to the users that activate instances of the customized probability item bundles, such distributions being made in accordance with the determined distribution probabilities.

2. The system of claim 1 wherein the one or more physical processors are configured to store the sets of potential awards included in the customized probability item bundles such that the stored sets of potential awards are available for access by the users during subsequent customizations of probability item bundles, include storing the first set of potential awards selected by the first user for the first customized probability item bundle, such that the first set of potential awards is available for access by the first user during customization of a second customized probability item bundle.

3. The system of claim 2 wherein the one or more physical processors are configured such that the offers to sell probability item bundles to users include offers to sell probability item bundles including the stored sets of potential awards.

4. The system of claim 1 wherein the one or more physical processors are configured such that facilitating customization of probability item bundles comprises restricting user selection of the potential awards included in the sets of potential awards of the customized probability item bundles.

5. The system of claim 4 wherein the one or more physical processors are configured such that restricting user selection of the potential awards included in the sets of potential awards of the customized probability item bundles includes assigning point values to individual ones of the potential awards, and setting threshold total point values for the sets of potential awards, wherein the threshold total point value corresponds to the summed point values of the potential awards included in the sets of potential awards.

6. The system of claim 4 wherein the one or more physical processors are configured such that restricting user selection of the potential awards included in the sets of potential awards of the customized probability item bundles includes ranking the potential awards on a multi-tier ranking system, and restricting the quantity of potential awards which can be included from individual tiers in the sets of potential awards.

7. The system of claim 1 wherein the one or more physical processors are configured such that facilitating customization of probability item bundles comprises adjusting the purchase price of the probability item bundle based on the user selection of potential awards included in the sets of potential awards.

8. The system of claim 1 wherein the one or more physical processors are configured such that facilitating customization of probability item bundle comprises effectuating presentation of a customization interface, wherein the customization interface is configured to receive the user entry and/or selection of the potential awards included in the sets of potential awards of the customized probability item bundles.

9. The system of claim 8 wherein the one or more physical processors are configured such that the customization interface includes a template for selecting potential awards for customization of the probability item bundles, wherein the template restricts selection of potential awards.

10. The system of claim 1 wherein the one or more physical processors are configured to generate custom offers to sell virtual items and/or sets of virtual items to users through the shop interface, wherein the custom offers include offers to sell instances of one or more of the individual potential awards included in the sets of potential awards of the customized probability item bundles selected by the users.

11. A method of customizing distribution of virtual items in an online game, the method being implemented in a computer system including one or more physical processor and storage media storing machine-readable instructions, the method comprising:

executing an instance of an online game, and using the instance of the online game to generate game state information that is transmitted to client computing platforms over a network, the game state information facilitating presentation of views of the online game to users via the client computing platforms, wherein execution of the instance of the online game further enables participation of the users in the online game by performing operations in the instance in response to commands received over the network from the client computing platforms;

effectuating presentation of offers to sell probability item bundles to users for consideration through a shop interface, wherein a given probability item bundle is associated with a set of potential awards, wherein individual ones of the potential awards within the set of potential awards include virtual items usable in the online game and are associated with distribution probabilities;

facilitating customization of probability item bundles offered for sale through the shop interface by receiving entry and/or selection by users of potential awards for inclusion in probability item bundles such that entry and/or selection of at least one potential award by a first user is received and the at least one potential award entered and/or selected by the first user is included in a first set of potential awards associated with a first customized probability item bundle;

determining distribution probabilities for the potential awards selected and/or entered by users and included in sets of potential awards of customized probability item bundles such that distribution probabilities for the first customized probability item bundle having the first set of potential awards that includes the at least one potential award are determined; and distributing potential awards to the users that activate instances of the customized probability item bundles, such distributions being made in accordance with the determined distribution probabilities.

12. The method of claim 11 additionally comprising the operation of storing the sets of potential awards included in the customized probability item bundles, such that the stored sets of potential awards are available for access by the users during subsequent customizations of probability item bundles, including storing the first set of potential awards selected by the first user for the first customized probability item bundle, such that the first set of potential awards is available for access by the first user during customization of a second customized probability item bundle.

13. The method of claim 12 additionally configured such that the offers to sell probability item bundles to users include offers to sell probability item bundles including the stored sets of potential awards.

14. The method of claim 11 wherein facilitating customization of probability item bundles comprises restricting user selection of the potential awards included in the sets of potential awards of the customized probability item bundles.

15. The method of claim 14 wherein restricting user selection of the potential awards included in the sets of potential awards of the customized probability item bundles includes assigning point values to individual ones of the potential awards, and setting threshold total point values for the sets of potential awards, wherein the threshold total point value corresponds to the summed point values of the potential awards included in the sets of potential awards.

16. The method of claim 14 wherein restricting user selection of the potential awards included in the sets of potential awards of the customized probability item bundles includes ranking the potential awards on a multi-tier ranking system, and restricting the quantity of potential awards which can be included from individual tiers in the sets of potential awards.

17. The method of claim 11 wherein facilitating customization of probability item bundles comprises adjusting the purchase price of the probability item bundle based on the user selection of potential awards included in the sets of potential awards.

18. The method of claim 11 wherein facilitating customization of probability item bundle comprises effectuating presentation of a customization interface, wherein the customization interface is configured to receive the user entry and/or selection of the potential awards included in the sets of potential awards of the customized probability item bundles.

19. The method of claim 18 wherein the customization interface includes a template for selecting potential awards for customization of the probability item bundles, wherein the template restricts selection of the potential awards.

20. The method of claim 11 additionally including generating custom offers to sell virtual items and/or sets of virtual items to users through the shop interface, wherein the custom offers include offers to sell instances of one or more of the individual potential awards included in the sets of potential awards of the customized probability item bundles selected by the users.

* * * * *